(12) United States Patent
Preisser

(10) Patent No.: US 6,325,311 B1
(45) Date of Patent: Dec. 4, 2001

(54) AXIAL FLOW CONCRETE RECLAIMER

(75) Inventor: Mark A. Preisser, Kiel, WI (US)

(73) Assignee: BFK Technologies, Inc., Kearney, MO (US)

(*) Notice: Subject to any disclaimer, the term of this patent is extended or adjusted under 35 U.S.C. 154(b) by 0 days.

(21) Appl. No.: 09/461,207

(22) Filed: Dec. 14, 1999

Related U.S. Application Data

(63) Continuation-in-part of application No. 09/238,056, filed on Jan. 27, 1999, now Pat. No. 6,000,645.

(51) Int. Cl.[7] .................................................. B02C 17/02
(52) U.S. Cl. .............................. 241/74; 241/299; 241/65
(58) Field of Search ................................ 241/65, 74, 299

(56) References Cited

U.S. PATENT DOCUMENTS

| | | |
|---|---|---|
| 1,458,387 | 6/1923 | Bourne . |
| 1,461,067 | 7/1923 | Moser . |
| 4,062,497 | 12/1977 | Kemp, Jr. et al. . |
| 4,382,559 | 5/1983 | Hellberg . |
| 4,418,871 | 12/1983 | Powell . |
| 4,538,767 | 9/1985 | Pimley . |
| 4,616,786 | 10/1986 | Riker . |
| 4,632,320 | * 12/1986 | Holz et al. .................... 241/46.17 |
| 4,981,581 | * 1/1991 | Didion ............................... 209/28 |
| 5,108,584 | 4/1992 | Bosseuk . |
| 5,234,172 | 8/1993 | Chupka et al. . |
| 5,312,051 | 5/1994 | Preisser . |
| 5,441,475 | 8/1995 | Storruste et al. . |
| 5,540,395 | 7/1996 | Branscome . |
| 5,613,902 | 3/1997 | Didion et al. . |
| 5,624,077 | 4/1997 | Branscome . |
| 5,685,978 | 11/1997 | Petrick et al. . |
| 5,906,321 | 5/1999 | Martin . |

* cited by examiner

Primary Examiner—Allen Ostrager
Assistant Examiner—William Hong
(74) Attorney, Agent, or Firm—Richard C. Litman

(57) ABSTRACT

A concrete reclaimer having a single meshed cylinder for separating concrete into its individual components. The reclaimer includes a hopper with a feed screw for feeding concrete aggregate into the reclaimer at a constant rate, a water spraying system for washing the concrete as it is being separated and flushing separated sand/cement components, heated inclined dewatering screws for separating the sand/cement slurry into its components, and settling ponds for removing cement from the water. The cylinder is made from coarse mesh which allows sand and cement to pass through, but not gravel, which is deposited onto an inclined conveyor adjacent the outlet the cylinder.

9 Claims, 3 Drawing Sheets

AXIAL FLOW CONCRETE RECLAIMER

CROSS REFERENCE TO RELATED APPLICATION

This application is a continuation-in-part of application Ser. No. 09/238,056, filed Jan. 27, 1999, now U.S. Pat. No. 6,000,645.

BACKGROUND OF THE INVENTION

1. Field of the Invention

The present invention relates to an apparatus for reclaiming wet concrete. More particularly, the present apparatus includes a feed hopper with a screw conveyor, a mesh cylinder for separating the concrete into its components, washing means, and means for separating the individual components from the water.

2. Description of the Related Art

Methods of separating concrete into its individual components have been proposed in the art, wherein the separated components can be stored and re-mixed at a later date. However, as compared to the other prior art developments, the present invention has the advantages of providing controlled feeding of concrete into the separation apparatus, simultaneous washing and separation of the concrete, and improved means for removing water from the sand.

U.S. Pat. No. 1,458,387 issued to Charles L. Bourne describes a process for treating concrete aggregate. The aggregate is placed in a drum rotating at a high speed, so that the individual particles are thrown against the sides of the drum at a high speed. The less desirable softer particles will be broken up into small pieces, while the more desirable hard particles will remain intact. The large and small particles can then be separated.

U.S. Pat. No. 1,461,067 to Robert W. Moser describes an apparatus for treating sand and gravel. The sand and gravel are dumped onto a shaker screen from an elevated position, separating the larger gravel from the smaller sand. The sand passes through additional screens, separating the sand into different sized particles. The gravel is discharged into an agitator where it is washed. This patent does not disclose an apparatus capable of washing and separating the concrete at the same time.

U.S. Pat. No. 4,062,497 to Dennis E. Kemp Jr. describes a mill system having a proportioning feeder. A ball or rod mill sends particles to an air classifier, which sends oversized particles back to the mill along with the raw materials. The raw materials are fed into the space at the upper portion of the volumetric feeder above the oversized particles, so that the amount of raw materials sent to the mill is dependant on the amount of oversized particles already in the volumetric feeder.

U.S. Pat. No. 4,382,559 to Enar V. Hellberg discloses a defibrator comprising at least one rotary cylindrical drum having deflectors on its inner surface. The disclosed defibrator includes a rotor consisting of a shaft coaxial with the cylindrical drum and blades radially extending from the shaft, which are adapted to receive material, such as waste paper, and project it on to the inner wall of the drum.

U.S. Pat. No. 4,418,871 to Stuart A. Powell describes an apparatus for reducing mineral crystalline material. The minerals are first directed through a milling device wherein a turbine sets up a shock wave to break up the particles. The particles then go to a classifier having a series of vertical baffles, where they go through a series of vertical motion reverses, eventually falling into a hopper containing like-sized particles.

U.S. Pat. No. 4,538,767 to John J. Pimley discloses an apparatus for recovering paper-making fiber from waste paper products. The disclosed apparatus include a perforated rotatable drum with a plurality of vanes and a rotor having blades, which are positioned to intercept material falling from the upper region of the drum and fling it back against the drum.

U.S. Pat. No. 4,616,786 to Rudolf Riker describes a plant for processing surplus concrete. Concrete is deposited from trucks into a receiving bin having a screw conveyor along the bottom. The screw conveyor drives the concrete to a cylindrical washer. The screw conveyor's speed is decreased as electrical consumption of the washer increases, maintaining a relatively constant throughput for the washer.

U.S. Pat. No. 4,632,320 to Emil Holz et al. discloses an apparatus for dissolving and sorting waste paper which comprises a spray pipe and a rotatable drum having a partially perforated wall, for mixing the waste paper and sorting out fibrous material.

U.S. Pat. No. 5,108,584 to Raymond Brosseuk describes an apparatus for extracting heavy metals from ore. The apparatus has two concentric drums oriented at an angle of 2°, to 15° from horizontal. The outer drum has an inner spiral vane. The inner drum has an upper fragmentation section with inwardly directed, longitudinally oriented impact vanes, a center trommel section having fine perforations at its upper end and coarse perforations at its lower end, and a lower discharge section. A sluice box is positioned to receive discharges from the upper end of the outer drum. The sluce box has a plurality of offset landings, with the upper landings intended to collect the coarser particles. The ore is separated into large tailings which are discharged from the lower end of the inner drum, and heavy, fine particles which are discharged from the top of the inner drum into the top of the sluce box.

U.S. Pat. No. 5,234,172 to David E. Chupka describes a method of cutting paper using a high pressure water stream.

U.S. Pat. No. 5,312,051 issued to the present inventor, Mark A. Preisser, describes a fresh wet concrete reclaimer. The concrete reclaimer has a rotating cylindrical screen angled between 1° and 10° from horizontal, and a spray bar. The screen rotates rapidly enough so that the concrete is carried up to a point 90° from the bottom. Sprayed water is directed towards the middle of the mass of concrete. The upper end of the screen is made from fine mesh which allows cement slurry to pass through it. The lower mesh is made from coarser mesh, allowing sand to pass through it. Gravel exits the opposite end of the screen.

U.S. Pat. No. 5,441,415 to Steinar Storruste and Mark A. Preisser (the present inventor) describes a centrifugal separator having a pair of mating horizontal frustroconical bowls and concentric inlet and outlet pipes, wherein the top bowl is held against the bottom bowl by a spring. A baffle fits inside the bowls. A slurry enters through the inlet pipe, and the spinning of the bowls causes the more dense particles to move towards the outside. Sufficient rotational force causes the bowls to separate, allowing the heaviest particles to exit. Liquid exits through the central outlet pipe.

U.S. Pat. No. 5,540,395 issued to Henry S. Branscome describes a concrete reclaimer comprising a rotating cylinder having a closed chamber and a screen chamber. Concrete is introduced to the closed chamber along with water to produce a slurry. The slurry is floated out of the closed chamber. The remaining sand and gravel is transferred to the screen chamber by four blades. The sand goes through the screen, and the gravel goes out the end of the reclaimer.

U.S. Pat. No. 5,613,902, issued to Michael S. Didion et al. on Mar. 25, 1997, describes a sand reclaimer. The sand reclaimer has concentric inner and outer cylinders. The inner cylinder is perforated to allow sand to pass through to the outer cylinder. A helical vane on the inside of the inner cylinder pushes sand towards the outlet, and a second helical vane on the outside of the inner cylinder pushes sand towards the inlet. Large perforations at the end of the inner cylinder allow large particles of sand to pass through, and castings come out the outlet. At the inlet, a dust cover allows small particles of sand to exit the reclaimer for collection, while larger particles are directed back to the inner cylinder at the inlet for further tumbling. This patent does not disclose a means for simultaneously washing and separating concrete aggregate, or for removing water from the components after separation.

U.S. Pat. No. 5,624,077 to Henry S. Branscome describes a concrete reclaimer comprising a rotating cylinder having a closed chamber and a screen chamber. Concrete is introduced to the closed chamber along with water, producing a slurry. The slurry is floated out of the closed chamber. The remaining sand and gravel is transferred to the screen chamber by eight blades. The sand goes through the screen, and the gravel goes out the end of the reclaimer.

U.S. Pat. No. 5,685,978 to Harold W. Petrick et al. describes a concrete reclaimer having a tank with two sections, and a pivoting screen between the two sections. Small particles filter through the screen into the first section, and large particles are dumped into the second section by pivoting the screen.

U.S. Pat. No. 5,906,321 to Ronald T. Martin discloses an apparatus for cleaning non-ferrous metals which comprises an infeed chute, a rotating tumbler where water and the metals are combined to remove ash and dirt which is directed to a holding tank. The cleaned metals are engaged by an upwardly angled rotating drum that includes an internal helix. The metals are moved by the helix to an outlet and pass through a second spray of water for further cleaning of the metals.

None of the above inventions and patents, taken either singularly or in combination, is seen to describe the instant invention as claimed. Thus a axial flow, bi-rotor concrete reclaimer solving the aforementioned problems is desired.

SUMMARY OF THE INVENTION

The present invention is a concrete reclaimer for separating waste or unused concrete into its individual components, which can then be stored and subsequently re-used. Concrete is typically mixed in large batches before loading onto trucks, so these trucks will commonly return to the plant with a partial load of unused concrete. The Environmental Protection Agency has mandated that such unused concrete be recycled and/or disposed of in accordance to the Storm Water Runoff Act of 1992.

The present concrete reclaimer includes a hopper with a feed screw, a single rotatable meshed cylinder, water sprayers for washing the concrete during separation, a conveyor for separating gravel, at least one dewatering screw for transporting and removing water from separated sand, and at least one settling pond for removing cement from the water. The concrete reclaimer may be powered by an electric motor that powers a hydraulic pump, which pumps oil through a hydraulic motor directly coupled to a central drive shaft at the outlet end of the cylinder. The drive shaft is connected to the cylinder by annular braces. The electric motor therefore powers the cylinder rotation by driving the hydraulic pump, which drives the hydraulic motor, which in turn drives the drive shaft.

When a cement truck returns with a partial load of unused concrete, the truck discharges the concrete into the hopper. The hopper has a feed screw at the bottom, which feeds concrete into the mesh cylinder. The hopper and feed screw arrangement ensures that concrete is fed into the cylinder at a constant rate. The cylinder is angled slightly downward, so that gravity causes the concrete aggregate to pass from the intake end to the outlet end. While in the cylinder, the concrete aggregate is washed using water pipes having apertures for spraying water through the cylinder. The angle of the cylinder combined with its rotation causes the concrete aggregate to travel from the inlet end towards the outlet end. The cylinder rotation also agitates the concrete aggregate, raising it up, and then causing it to fall when the aggregate reaches a height where the cylinder rotation can no longer carry it higher. Washing the concrete reduces the tendency of the concrete aggregates to clump together, resulting in more effective separation. The cylinder is made from coarse mesh, which allows sand and cement to pass through it, while preventing gravel from passing through. Gravel travels through the cylinder, and is deposited from the cylinder's outlet end onto a conveyor leading to a gravel pile for storage.

Sand and cement pass through the cylinder into the bottom of the reclaimer, where lower nozzles flush the sand and cement through an outlet into dewatering screws. Each dewatering screw is contained inside a tray angled upward. As sand is pushed upward by the dewatering screw, water and cement runs downward away from the sand. Dry sand is deposited from the top of the dewatering screw into a sand storage area, while the cement and water are conveyed to a series of settling ponds. Each successive settling pond allows additional cement to settle out of the water, until the water becomes clean at the final settling pond.

Preferably, the trays for the dewatering screws sit on top of a tank containing a heated liquid, which is preferably a mixture of water and antifreeze, but which may also be oil. The heated liquid never comes in actual contact with the sand/cement slurry in the dewatering screws, but is always in thermal contact, which prevents the water in the sand/cement slurry from freezing in cold weather.

Accordingly, it is a principal object of the present invention to provide a means of efficiently separating concrete aggregate into its individual components for recycling.

It is another object of the present invention to provide a means of feeding concrete aggregate into the reclaimer at a constant rate.

It is a further object of the invention to provide a system for removing water from the separated sand and cement even at temperatures below freezing.

Still another object of the invention is to wash and separate all of the individual components of the concrete aggregate at the same time.

Yet another object of the present invention is to recycle water from the settling ponds back to the concrete reclaimer or reuse.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a concrete reclaimer having a single meshed cylinder for separating concrete into its individual components for later re-use. The reclaimer includes a hopper with a feed screw for feeding concrete aggregate into the reclaimer at a constant rate, a water spraying system for washing the concrete as it is being separated, heated dewatering screws for separating the sand/cement slurry into its components, and settling ponds for removing cement from the water.

Figure 2:
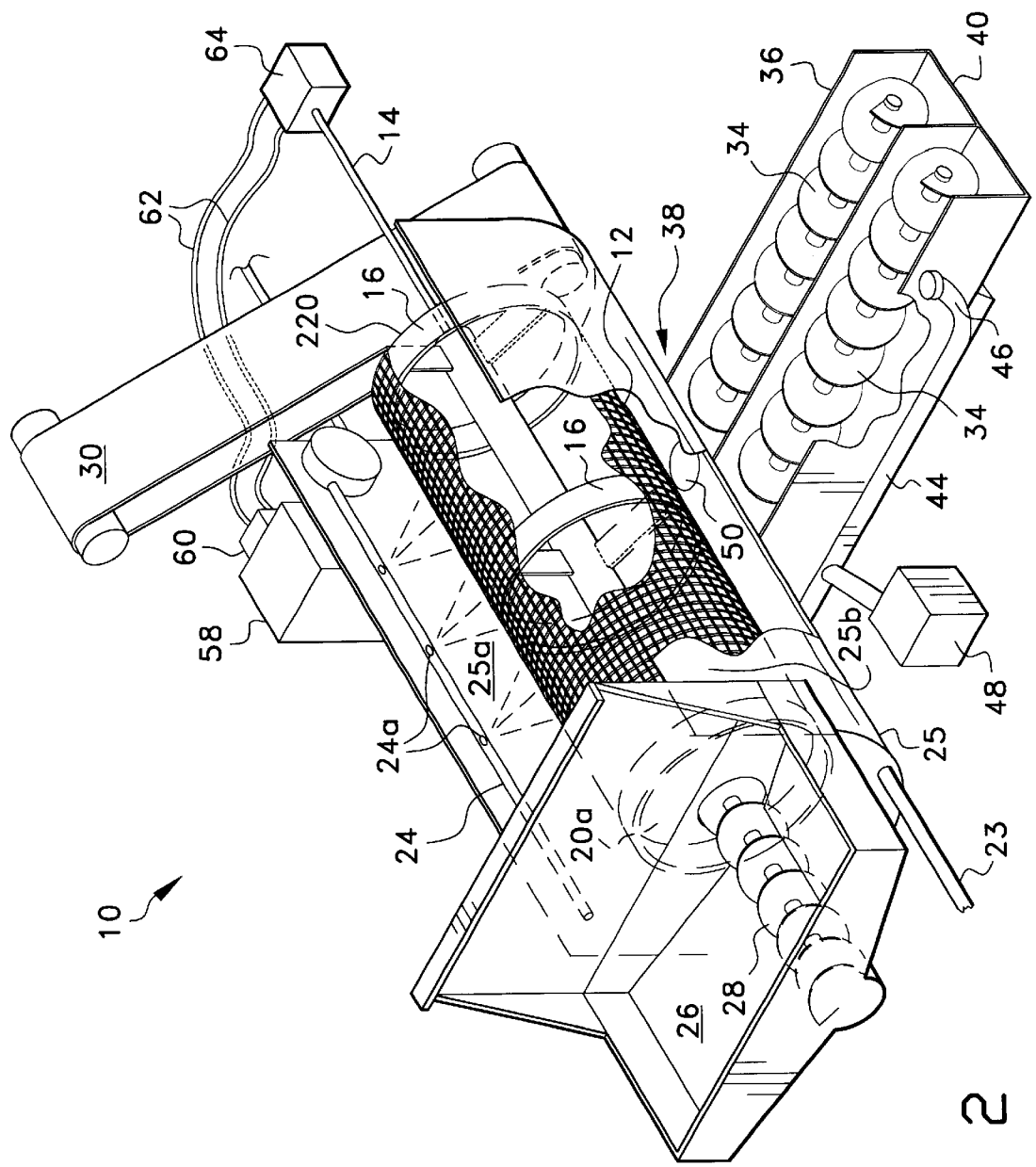
FIG. 2 is a perspective view of the axial flow concrete reclaimer according to the present invention.

Referring first to FIG. 2, concrete reclaimer 10 comprises a coarse meshed cylinder 12 connected to drive shaft 14 by means of annular support braces 16. Meshed cylinder 12 is concentrically located within U-shaped housing 25 and has an intake end 20a and outlet end 22a. Preferably, meshed cylinder 12 consists of a tubular metal screen having openings of approximately ¼ inch. Inlet end 20a is elevated relatively higher than outlet end 22a, thereby allowing concrete aggregate to flow through the cylinder due to the force of gravity. Water spray pipe 24 is attached to wall 25a of housing 25 and runs above cylinder 12 substantially along its length. A second water spray pipe (not shown) may be similarly attached to the opposite wall 25b of housing 25. Water spray pipe 24 has a plurality of spaced-apart apertures 24a for directing pressurized water through cylinder 12. Located at the front of housing 25 is an inlet nozzle 23 for directing pressurized water below cylinder 12 towards the lower portion of housing 25.

Inlet end 20a of meshed cylinder 12 is adjacent to hopper 26. Hopper 26 has feed screw 28 at its bottom. Feed screw 28 is axially disposed with respect to cylinder 12, and is connected at its end to drive shaft 14. Outlet end 22a of cylinder 12 is adjacent to the lower end of inclined conveyor belt 30. The upper end of conveyor belt 30 extends to a position above gravel storage area 32 as shown in FIG. 3.

Dewatering screws 34 are each contained within a tray 36, which has a lower end 38 positioned beneath opening 50 disposed at the bottom of housing 25. Lower end 38 of tray 36 receive the separated sand/cement/water slurry through opening 50. Water and cement drain from the lower end 38 of tray 36, and separated sand is deposited from upper end 40 into sand storage area 42 (FIG. 3).

Liquid heating tank 44 is directly beneath cray 36. Tank 44 contains water and/or antifreeze, or oil. The liquid in tank 44 is isolated from tray 36, but tank 44 is in thermal contact with tray 36. Tank 44 is filled using valve 46, and the liquid is heated by heater 48.

Figure 3:
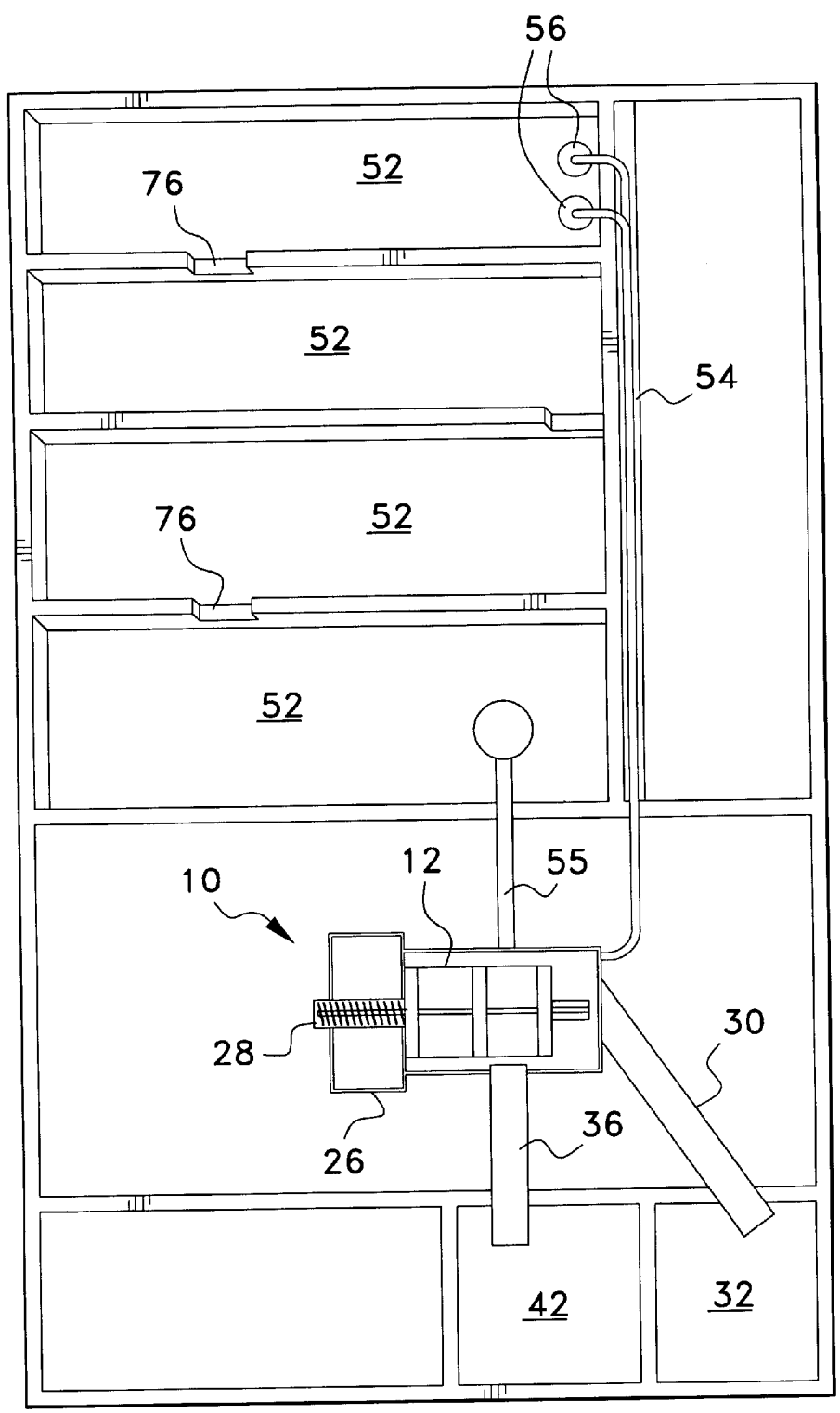
FIG. 3 is a top plan view of a system for reclaiming concrete using the axial flow reclaimer according to the present invention.

Referring to FIG. 3, water and cement drained from the lower end 38 of tray 36 is delivered via chute 55 to a series of settling ponds 52. The settling ponds 52 are connected by weirs 76, allowing water to flow from near the top of one settling pond 52 to the next settling pond 52. Pipe 54 runs from the last settling pond 52 to one end of water spray pipe 24 through pump 56.

Referring back to FIG. 2, power is supplied to the concrete reclaimer 10 by electric motor 58. Electric motor 58 operates hydraulic pump 60, which pumps oil through hoses 62 to hydraulic motor 64. Hydraulic motor 64 is connected to drive shaft 18. Drive shaft 18, connected to support braces 16, and running through cylinder 12 to feed screw 28, can thereby rotate cylinder 12 and feed screw 28. In a similar manner, hydraulic pump 60 also powers a second hydraulic motor for operating the dewatering screws 34, and a third hydraulic motor for operating the conveyor belt 30. The second and third hydraulic motors, powering the dewatering screws 34 and conveyor belt 30, are not shown in the figures for simplicity, as the use of a hydraulic motor to power a rotating mechanical implement is well known.

Figure 1:
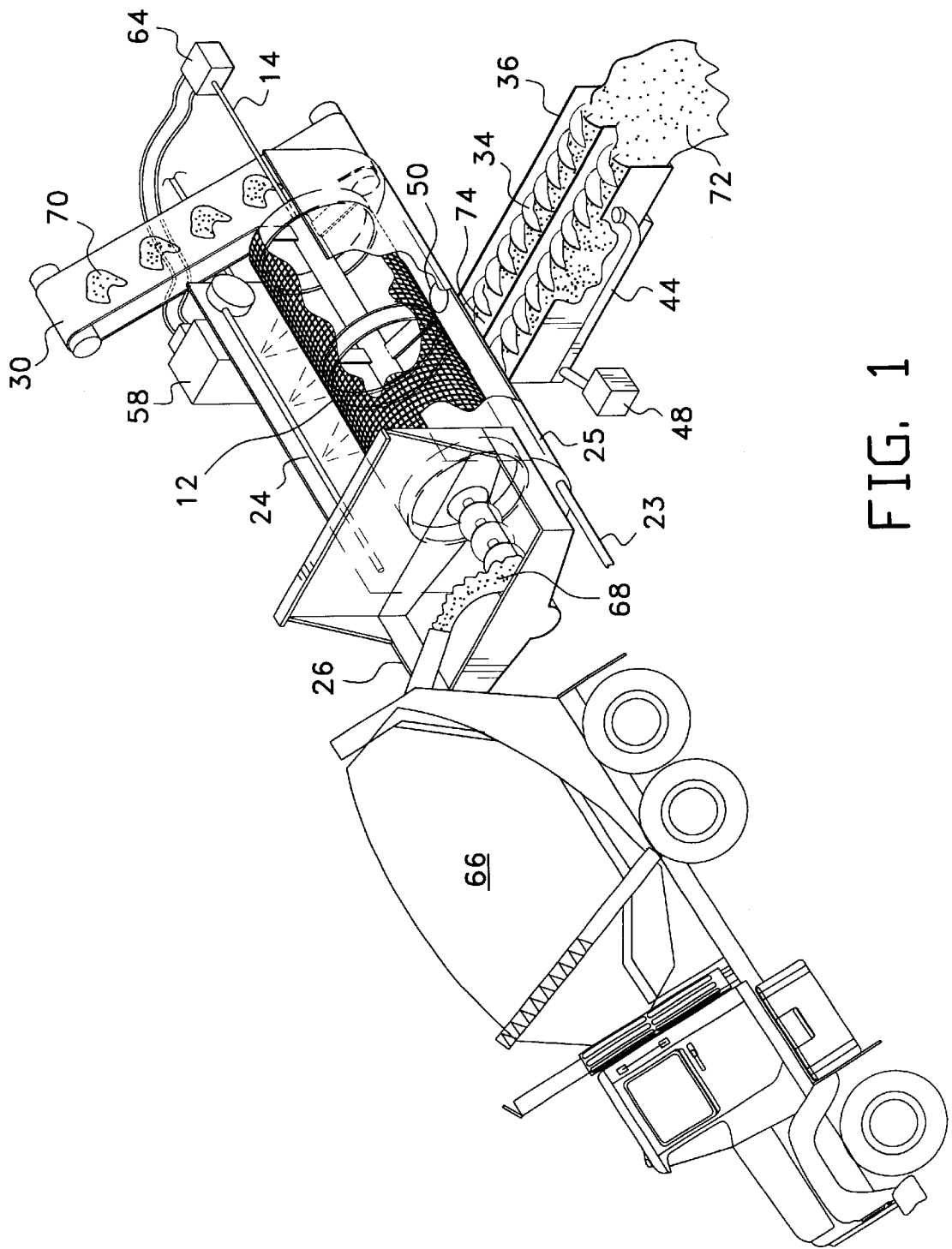
FIG. 1 is an environmental, perspective view of an axial flow concrete reclaimer according to the present invention.

The process of reclaiming unused wet cement is illustrated in FIGS. 1 and 3. Cement truck 66 deposits wet concrete aggregate 68 into hopper 26. Feed screw 28 feeds concrete aggregate 68 into cylinder 12 at inlet 20a. Motor driven shaft 14 rotates cylinder 12, causing concrete aggregate 68 to rise a certain distance, and then fall when it reaches a height where the rotation of the cylinders can no longer lift it higher. The rotation of the cylinder, combined with its downward angle, causes the aggregate to be pulled by gravity from the inlet end 20a to the outlet end 22a. Water is sprayed over the concrete aggregate from water spray pipe 24, preventing the concrete aggregate 68 from clumping. Simultaneously, water from inlet nozzle 23 is sprayed below cylinder 12 towards the lower portion of housing 25. The concrete aggregate 68 comprises gravel 70, sand 72, and cement 74. The course meshed cylinder 12 allows sand 72 and cement 74 to pass through, but does not allow gravel 70 to pass through the cylinder 12. Gravel 70 therefore travels to outlet end 22a, where it is deposited on conveyor belt 30, which transports it to gravel storage area 32.

Sand 72 and cement 74 which passes through course meshed cylinder 12 is flushed by water from inlet nozzle 23 through opening 50, where the sand/cement slurry is deposited into the lower end of tray 36, containing dewatering screws 34. Dewatering screws 34 push sand 72 towards the upper end 40 of tray 36, while allowing water and cement to drain out the lower end 38 of tray 36. Tank 44, containing liquid heated by heater 48, prevents the water from freezing if the outside temperature drops below 32° F.

Cement 74, along with wash water, is delivered through chute 55 into the first of settling ponds 52. Some of cement 74 settles out of the water in the first settling pond 52. As cement and water flows into the first settling pond 52, water is displaced from that settling pond 52 to the next settling pond 52 over weirs 76, where additional cement settles out. By the time the water flows into the last settling pond 52, most or all of the cement has settled out of the water, leaving only clean water. This clean water is pumped by pump 56 through pipe 54 into water spray pipe 24, to continue washing the concrete aggregate 68. This recycled water from the last settling pond 52 is also channeled to inlet nozzle 23, and may be used to keep the hopper 26 rinsed clean.

Once the gravel 70, sand 72, and cement 74 has been separated from each other and from the water, and placed into storage, they can be re-used at a later time.

It is to be understood that the present invention is not limited to the embodiment described above, but encompasses any and all embodiments within the scope of the following claims.

I claim:

1. A concrete reclaimer, comprising:
   a housing having a front end and a bottom containing an opening;

an elongated cylinder disposed within said housing, said cylinder having coarse mesh walls, an intake end and an outlet end, said intake end being higher than said outlet end;

a hopper adjacent said intake end of said cylinder, said hopper including a feed screw axially disposed with respect to said cylinder;

at least one inclined dewatering screw having a lower end positioned beneath the opening in said housing;

an inclined conveyor having a lower end adjacent said outlet end of said cylinder;

power means for rotating said cylinders and operating said at least one dewatering screw and said conveyor;

means for spraying water through said cylinder; and means for directing water below said cylinder towards the bottom of said housing.

2. The concrete reclaimer according to claim 1, wherein said means for directing water below the cylinder includes an inlet nozzle disposed at the front of said housing.

3. The concrete reclaimer according to claim 1, wherein said means for spraying water is a pipe extending above said cylinder, said pipe having apertures for spraying water through said cylinder.

4. The concrete reclaimer according to claim 1, further comprising a heated liquid-containing tank in thermal contact with said at least one dewatering screw.

5. The concrete reclaimer according to claim 1, further comprising at least one settling pond for removing water from separated cement.

6. The concrete reclaimer according to claim 1, wherein said power means is a motor.

7. The concrete reclaimer according to claim 6, further comprising a central drive shaft having a first end connected to said motor, and a second end connected to said cylinder.

8. The concrete reclaimer according to claim 6, wherein said motor is electric.

9. The concrete reclaimer according to claim 6, wherein said motor is hydraulic.

* * * * *